United States Patent
Larson et al.

(10) Patent No.: US 8,953,242 B2
(45) Date of Patent: Feb. 10, 2015

(54) VARIBLE FOCUS STEREOSCOPIC DISPLAY SYSTEM AND METHOD

(75) Inventors: Brent D. Larson, Cave Creek, AZ (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 349 days.

(21) Appl. No.: 13/077,197

(22) Filed: Mar. 31, 2011

(65) Prior Publication Data

US 2012/0250152 A1 Oct. 4, 2012

(51) Int. Cl.
G02B 27/22 (2006.01)
G02B 27/26 (2006.01)
H04N 13/04 (2006.01)

(52) U.S. Cl.
CPC ........ *G02B 27/2264* (2013.01); *G02B 27/2228* (2013.01); *G02B 27/26* (2013.01); *H04N 13/04* (2013.01); *H04N 2213/008* (2013.01)
USPC ............................ 359/464; 359/466; 359/376

(58) Field of Classification Search
CPC .............. G02B 27/22; G02B 27/2228; G02B 27/2264; G02B 27/2242; H04N 13/04
USPC ...................... 359/464, 466, 376, 473; 348/51
See application file for complete search history.

(56) References Cited

U.S. PATENT DOCUMENTS

| | | | |
|---|---|---|---|
| 3,785,724 A | 1/1974 | Cretin-Maitenaz | |
| 4,830,482 A | 5/1989 | Resnikoff | |
| 5,175,616 A | 12/1992 | Milgram et al. | |
| 5,422,689 A | 6/1995 | Knapp et al. | |
| 5,825,456 A * | 10/1998 | Tabata et al. | 351/201 |
| 6,069,650 A * | 5/2000 | Battersby | 348/59 |
| 6,072,443 A * | 6/2000 | Nasserbakht et al. | 345/7 |
| 6,186,626 B1 | 2/2001 | Francois et al. | |
| 6,414,681 B1 | 7/2002 | Ohshima et al. | |
| 6,449,309 B1 | 9/2002 | Tabata | |
| 6,454,411 B1* | 9/2002 | Trumbull | 351/211 |
| 6,507,359 B1* | 1/2003 | Muramoto et al. | 348/47 |
| 6,545,650 B1 | 4/2003 | Yamada et al. | |
| 6,568,809 B2 | 5/2003 | Trajkovic et al. | |
| 6,611,283 B1 | 8/2003 | Isonuma | |
| 6,619,799 B1* | 9/2003 | Blum et al. | 351/159.39 |
| 6,733,132 B2 | 5/2004 | Shevlin | |
| 6,778,150 B1 | 8/2004 | Maguire, Jr. | |
| 6,919,907 B2 | 7/2005 | Berstis | |
| 7,091,931 B2 | 8/2006 | Yoon | |
| 7,298,393 B2 | 11/2007 | Morita | |

(Continued)

FOREIGN PATENT DOCUMENTS

| | | | | |
|---|---|---|---|---|
| JP | 62115989 A | * | 5/1987 | H04N 13/04 |
| JP | 03292093 A | * | 12/1991 | H04N 13/04 |

OTHER PUBLICATIONS

Nabuhiko Kenmochi "Three-Dimensional Display Device," human translation of JP 03292093, Oct. 2013, pp. 1-7.*

(Continued)

*Primary Examiner* — Thomas K Pham
*Assistant Examiner* — Marin Pichler
(74) *Attorney, Agent, or Firm* — Ingrassia Fisher & Lorenz, P.C.

(57) ABSTRACT

A variable focus stereoscopic display system includes first and second lenses positioned between a viewer's eyes and a stereoscopic display that alters the distance to the focus plane of the viewer based on the vergence of the viewer's eyes while viewing the stereoscopic display.

6 Claims, 5 Drawing Sheets

(56) References Cited

U.S. PATENT DOCUMENTS

| | | |
|---|---|---|
| 7,336,244 B2 * | 2/2008 | Suyama et al. .................... 345/6 |
| 7,428,001 B2 | 9/2008 | Schowengerdt et al. |
| 7,439,940 B1 | 10/2008 | Maguire, Jr. |
| 7,705,876 B2 | 4/2010 | Starkweather et al. |
| 7,740,358 B2 | 6/2010 | Pedrono et al. |
| 2003/0197933 A1 | 10/2003 | Sudo et al. |
| 2008/0284844 A1 * | 11/2008 | Woodgate et al. .............. 348/54 |
| 2008/0284979 A1 * | 11/2008 | Yee et al. ....................... 351/209 |
| 2009/0167845 A1 | 7/2009 | Khan |
| 2009/0322861 A1 | 12/2009 | Jacobs et al. |
| 2011/0178784 A1 | 7/2011 | Sato et al. |

OTHER PUBLICATIONS

Hiroichi Honma et al. "Stereoscopic Dispaly System," human translation of JP 06085590, Oct. 2013, pp. 1-8.*

Nair, S.N. et al; Cognitive Feedback Training Using 3D Binocular Eye Tracker. Proceedings of the Human Factors and Ergonomics Society Annual Meeting, Oct. 2001.

* cited by examiner

ALTERING A FOCUS PLANE DISTANCE BETWEEN A STEREOSCOPIC DISPLAY FOCUS PLANE AND FIRST AND SECOND EYES OF A VIEWER IN RESPONSE TO VERGENCE OF THE FIRST AND SECOND EYES, WHEREIN CHANGES IN THE FOCUS PLANE DISTANCE ARE POSITIVELY CORRELATED WITH CHANGES IN THE CONVERGENCE DISTANCE OF THE FIRST AND SECOND EYES' LINE OF SIGHT

VARIBLE FOCUS STEREOSCOPIC DISPLAY SYSTEM AND METHOD

TECHNICAL FIELD

The exemplary embodiments described herein generally relate to information displays and more particularly to stereoscopic displays.

BACKGROUND

Three dimensional (3D) displays are becoming increasingly popular. Presently, many 3D displays implement stereoscopic techniques to generate a 3D visual display to a user. Such displays, which may be referred to as stereoscopic 3D displays, rely on the well known stereoscopic imaging technique for creating the illusion of depth in an image. As is generally known, stereoscopy is a method of creating a 3D image from a pair of two dimensional (2D) images, in which each of the 2D images preferably represents the same object or image from a slightly different perspective, such as a right eye perspective and a left eye perspective.

Referring to FIG. 1, a typical prior art stereoscopic display 102 is configured to generate a 3D representation of an image viewable by a viewer 104. A left eye 106 and a right eye 108 of the viewer 104 are focused on a focus plane 109 at the stereoscopic display 102 (the viewer 104 is a binocular viewer having two eyes separated by an interpupillary distance 110). A left stereo channel selection mechanism 112 is positioned between the left eye 106 and the stereoscopic display 102 and a right stereo channel selection mechanism 114 is positioned between the right eye 108 and the stereoscopic display 102. Two stereo perspective views, a left perspective view 116 and a right perspective view 118, of a single stereoscopic object or feature 120 are presented to the binocular viewer with a convergence plane 122 (perceived location) based on vergence. The distance between the focus plane 109 and the convergence plane 122 is a depth cue disparity 121. Stereo channel selection mechanisms 112 and 114 can take many conventional forms well known in the art, including polarized filters, colored filters, temporal shutters, and others. These selection mechanisms 112, 114 can also be incorporated as part of the display, for example using lenticular arrays or other mechanisms known in the art. The function of the stereo selection mechanisms 112, 114 is to cause the left eye 106 to see only left perspective view 116 and right eye 108 to see only right perspective view 118. When the viewer's gaze is directed at feature 120, the perceived depth, or distance from the viewer, of feature 120 is determined by the intersection or converging of the lines of sight from the eyes to their respective perspective views.

Stereoscopic display systems, which provide enhanced interpretation of the information by users over two dimensional displays and can result in improvements in performing various tasks as well as various other potential benefits, may be used for applications which rely on periods of extended concentration and/or critical information, such as avionics, medical, engineering/industrial or military applications, and may also be used for applications of shorter concentration periods, such as entertainment applications, for example, movies. Stereoscopic 3D displays have been conventionally directed toward intermittent and non-critical applications such as entertainment and modeling. One of the lingering concerns of use for extended periods or critical information is the human tolerance for the vergence-accommodation disparity present in these displays. Vergence refers generally to the relative inward angle of the two eyes to detect depth, whereas accommodation refers to the distance for which the eyes are optically focused. Under normal real-world circumstances of viewing actual objects (including most two dimensional electronic displays), the vergence and accommodation cues typically match. Both of these cues are valid 3D depth or distance cues, along with a number of other 3D cues, for example, motion parallax, occlusion, relative size, absolute size, linear perspective, and shading/shadows. Conventional stereoscopic displays achieve the sensation of 3D by manipulating vergence cues while having the eyes remain focused on a fixed display surface or screen. This disparity between competing depth cues can result in viewer fatigue and discomfort, especially over an extended period of time, and can potentially interfere with the benefits of using a stereoscopic display. The potential for fatigue, including eyestrain, headaches or other discomfort, is generally believed to be increased as the degree of mismatch increases and can potentially interfere with the benefits of using a stereoscopic display.

As the environment, such as aviation, in which these stereoscopic systems are used becomes more complex, it is preferable that the operator be attentive and receive information in a timely manner and with little stress (such as eye fatigue) to ensure proper operation. The user must interpret the information provided on the screen occupying his/her thought processes when he/she may have many other decisions to make.

Accordingly, it is desirable to provide a method and system displaying information stereoscopically that may be more easily understood by the user without taxing human tolerances. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

Apparatus' and methods alter the distance to the focus plane of the stereoscopic 3D display based on the vergence of the eyes while viewing portions of the display. Embodiments include both active and passive methods.

In a first exemplary embodiment, a variable focus stereoscopic display system defining a focus plane, the variable focus stereoscopic display system comprising a first lens configured to be positioned between a first eye and a stereoscopic display, and a second lens configured to be positioned between a second eye and the stereoscopic display, wherein the first and second lenses are configured to modify the distance of the focus plane from the first and second eyes in response to a vergence of the first and second eyes, and changes in the focus distance are positively correlated with changes in the convergence distance of the lines of sight of the first and second eyes.

Another variable focus stereoscopic display comprises a focus plane, a first lens configured to be positioned over a first eye for viewing the stereoscopic display, a second lens configured to be positioned over a second eye for viewing the stereoscopic display, the first and second lenses each comprising a first portion having a first optical power, and a second portion having a second optical power higher than the first optical power, the first and second portions configured to increase the focus distance as the convergence distance increases (corresponding to decreased convergence), and to decrease the focus distance as the convergence distance decreases (corresponding to increased convergence).

A method for adjusting a focus plane for viewing a stereoscopic display, comprising altering the distance of the focus plane from first and second eyes in response to vergence of the first and second eyes, wherein changes in the focus plane distance are positively correlated with changes in the convergence distance.

BRIEF DESCRIPTION OF THE DRAWINGS

The present invention will hereinafter be described in conjunction with the following drawing figures, wherein like numerals denote like elements.

DETAILED DESCRIPTION

Figure 1:
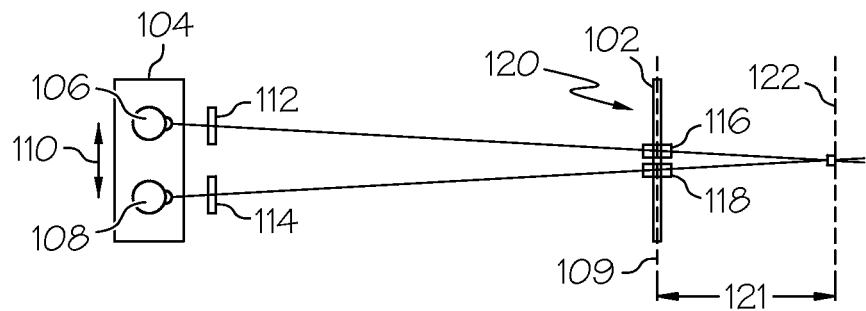
FIG. 1 is a prior art schematic of two eyes viewing a displayed feature on a stereoscopic display.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A stereoscopic display system (three dimensional (3D)) provides two images of the same object taken from two perspectives that when viewed by two eyes are interpreted as an image having depth (depth perception). The stereoscopic display system described herein provides enhanced usability by users of the display, especially for applications which rely on extended duration and/or critical information, such as avionics, medical, engineering/industrial, or military applications. Entertainment-based applications would also benefit from these improvements even though the user has an increased opportunity to divert attention from the stereoscopic content and thereby reduce a strain on human tolerance.

The exemplary embodiments described herein alter the distance to the focus plane of the stereoscopic 3D display based on the vergence of the eyes while viewing portions of the display. Embodiments include both active and passive methods.

The following definitions apply as used herein. Convergence means central or foveal binocular lines of sight rotated inward and crossing at a point in front of the viewer. Increased and decreased convergence corresponds to the crossing point being closer to or further from the viewer, respectively. Substantially zero convergence corresponds to the crossing point being very distant, e.g., infinity, from the viewer. Divergence refers to the lines of sight diverging (moving apart) from zero convergence in front of the viewer, which is not normally the case for human viewers. Vergence describes the relationship of convergence to divergence. Focus distance is the distance from the eye to the effective apparent plane of focus as seen by the eye. Convergence distance is the distance from the eye to the convergence crossing point.

A first embodiment involves the use of dynamic focus lenses over each eye. These lenses are preferably electro-optically adjustable, for example through the use of switchable liquid crystal materials, electro-active polymer gels, field deformable surfaces or other optically switchable materials.

The drive signal for the lens pair is to be derived from a corresponding differential eye tracking sensor mechanism, such as one or more small sensors (cameras) which would detect the relative orientation or vergence of the two eyes. In one example, as the two eyes converge to a binocular representation of a particular object or feature in the stereoscopic image, the sensor would detect the apparent stereo distance from the eyes and would add or subtract optical power to the lenses to make the apparent focus distance of the object or feature match the convergence distance based on vergence cues. The variable focus lenses would preferably be adjusted to a more positive (or less negative) power to effectively increase the apparent focus distance when vergence cues indicate greater distance or depth. For showing an object at infinity, a preferred (but non-limiting) positive focal length for the lenses would be the distance from the lenses to the stereoscopic display screen or panel. For apparent depths close to the viewer and in front of the display, the lenses would preferably impart a somewhat negative (or less positive) optical power such that the eyes, including normally worn corrective eyewear or contact lenses, would have to focus closer to see a sharp image. In this manner, relative changes in the one depth cue, the focus distance, are positively correlated with relative changes in another depth cue, the convergence distance.

While full compensation of the accommodation distance might completely remove visual fatigue, partial compensation may be sufficient. Visual fatigue from depth cue mismatches is difficult to quantify, and propensity for fatigue may vary significantly from person to person.

A passive variable focus embodiment includes a suitable pair of progressive focus lenses. In typical bifocal or progressive lenses for reading or other close up work, the optical power of the lens most typically increases from top to bottom of the lens. In this embodiment, however, the optical power of the lens increases from the inner edge (converged lines of sight suggesting slight negative power in the variable focus lens) and reaching zero or preferably higher power toward the centers and outer regions of the progressive lenses.

Yet another embodiment is a variant on the passive progressive lens approach which applies a correction while allowing somewhat more user control based on viewer head position. As in previous embodiments, there is a vergence-dependency of the optical power, but this is combined with an up/down tilt aspect.

A further option is to combine these active and passive techniques to reduce the degree of actively switched optical power needed and at the same time relax the need to center the foveal view relative to the passive eyewear. Similarly, both active and passive methods can be used to restrict the variable power to the viewing of the particular display, while avoiding the variable power when looking away from the display. Numerous other similar techniques and/or apparatus are possible.

While described in the context of a standard display, such as an active-matrix liquid crystal display, plasma, organic light emitting diode, projection, or other real image display, similar techniques can be used with a collimated display, such as a head up display or binocular near-to-eye display, which provides vergence cues.

The system/approach as described applies the disclosed techniques to expand the range of accommodation or focus distance required of the viewer's eyes, so that instead of simply focusing on the plane of a stereoscopic display, the eyes focus over a larger and more natural range for the imagery being viewed. Another candidate usage for the above described techniques is to instead shrink the range of accommodation or focus distance required from the viewer's eyes when viewing a real world or other volumetric scene. This would be analogous to using conventional progressive or bifocal eyewear, except that the effective lens prescription being utilized would be controlled, either actively or through a combination of both active and passive techniques, based on actual eye vergence rather than tilting of the head. In this case, the progression of the optical power would preferably be reversed from the stereoscopic embodiments.

The lenses described in the various embodiments may be implemented in any one of several arrangements, for example, binoculars, or embedded in a hardware system in which the viewer would move his eyes to the lenses or otherwise appropriate vantage point; however, the preferred embodiments are implemented in a head-worn system as described hereinafter. Additionally, the display may alternatively be included in the head worn system. Though the methods and systems may be implemented in any one of several environments, for example, medicine, modeling, and mobile vehicle such as automobiles, ships, and heavy machinery, the use in an aircraft system is described as an example.

Techniques and technologies may be described herein in terms of functional and/or logical block components, and with reference to symbolic representations of operations, processing tasks, and functions that may be performed by various computing components or devices. Such operations, tasks, and functions may be referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 2:
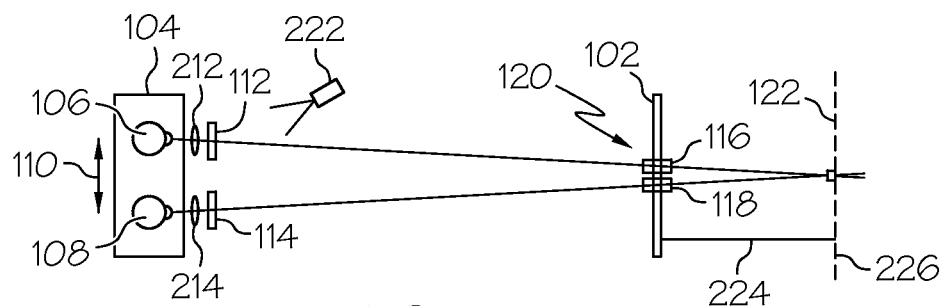
FIG. 2 is a schematic of two eyes viewing a displayed feature on a stereoscopic display having a first shifted focus plane in accordance with an exemplary embodiment.

Referring to FIG. 2 and in accordance with an exemplary embodiment, like elements in FIG. 2 are identified with like reference numerals of those in FIG. 1. The stereoscopic display 102 may be implemented using any one of numerous suitable stereoscopic display devices now known or developed in the future. The stereoscopic display 102 may also be implemented using either coplanar display media or non-coplanar display media. A sensor 222 is positioned with respect to the eyes 106, 108 of the viewer 104 for determining the amount, or degree, of vergence, typically convergence which is an inward viewing angle, of the eyes towards one another. The sensor 222 could take any form capable of detecting the relative directions the two eyes 106, 108 are aimed, and may be mounted along with the lenses 212, 214 and any other optical components required such as polarizers, shutters, selective filters and/or corrective eyewear. The sensor 222 could sense vergence via analysis of sensor imagery, or alternately could sense vergence by mechanical, electrical or any other means possible. The lens 212 is positioned between the left eye 106 and the stereoscopic display 102 and the lens 214 is positioned between the right eye 108 and the stereoscopic display 102. These lenses 212, 214 are preferably electro-optically adjustable, for example through the use of switchable liquid crystal materials, electro-active polymer gels, field deformable surfaces or other optically switchable materials. See for example, the technology described in U.S. Pat. Nos. 4,190,330 or 6,619,799. Dynamically adjusted contact lenses would be another embodiment. Alternately, the lenses could be mounted separately from the head of the viewer. A single lens or lens region could be used provided both lines of sight pass through it. Other dynamic focus means would also be possible, such as optics moved or deformed by mechanical means, or switchable viewing screen depths. Modifying the focus of the lens or lens system in this context refers to modifying the optical power, and thereby the related focus distance for the display. It should be noted that the focus distance is adjusted based on vergence of the eyes, not the input image data to the stereoscopic display.

Figure 3:
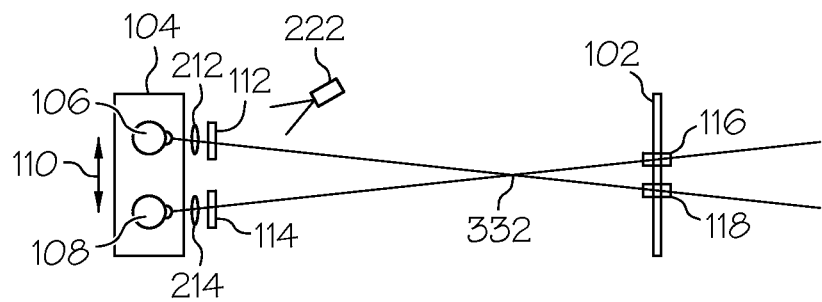
FIG. 3 is a schematic of two eyes viewing a displayed feature on a stereoscopic display having a second shifted focus plane in accordance with an exemplary embodiment.
Figures 4, 5:
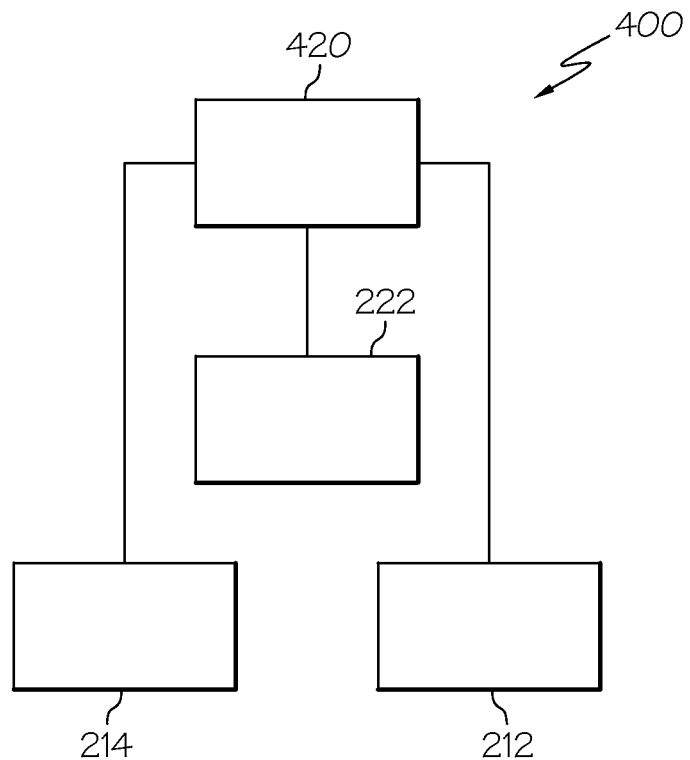
FIG. 4 is a functional block diagram of a system in accordance with the exemplary embodiment of FIG. 2.
FIG. 5 is a flow chart of the method for implementing the exemplary embodiments.

FIG. 4 depicts a block diagram of a system 400 in accordance with the present embodiments. A processor 420 is coupled to the lenses 212, 214 and is configured to receive information from the sensor 222 regarding the degree of vergence and, in response thereto, adjust the strength of the lenses 212, 214 to alter the focal point or focal length. For example, when the sensor 222 determines the eyes have rotated outward (away from one another, such that they are less converged), the lenses 212, 214 are adjusted to shift the required focus of the eyes 106, 108 the distance (focus plane shift) 224 (FIG. 2) from the display screen 102 (where the eyes are focused without adjustment) to a focus plane 226 (FIG. 2) further from the eyes 106, 108 (the maximum line of sight would be infinity). Alternatively, if the sensor 222 senses the eyes have turned more inward (FIG. 3) towards one another (more converged), the lenses 212, 214 are adjusted to shift the corresponding focus of the eyes 106, 108 to a convergence plane 332 closer to the eyes 106, 108.

This method (FIG. 5) of adjusting the visual focus for viewing a stereoscopic display includes the step of altering the focus plane distance between a stereoscopic display focus plane and first and second eyes of a viewer in response to vergence of the first and second eyes, wherein changes in the focus plane distance are positively correlated with changes in the convergence distance for the first and second eyes' lines of sight.

Figure 6:
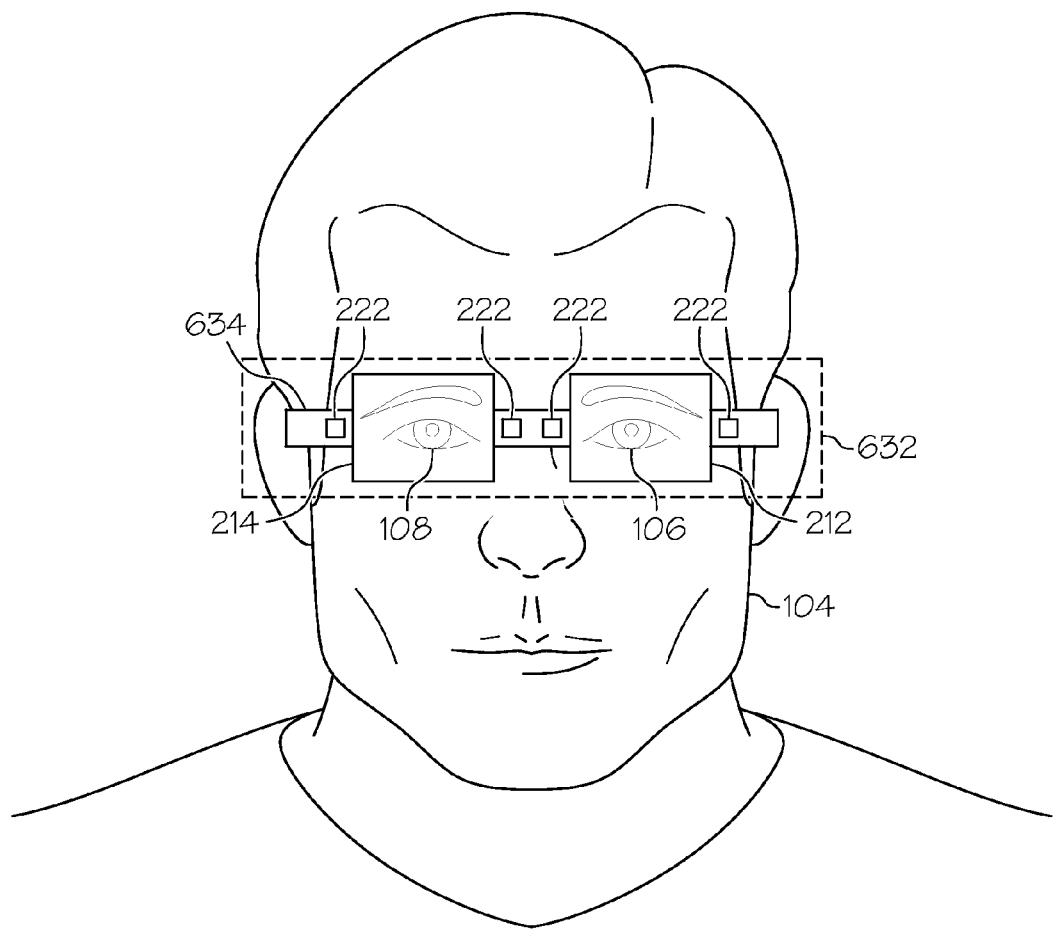
FIG. 6 is a near-to-eye stereoscopic display system in accordance with an exemplary embodiment.

The adjustment of the visual focus for a stereoscopic display may be accomplished in several types of systems, for example, the vergence sensor 222 and the lenses 212, 214 may be positioned on a stationary apparatus, with the user positioning himself to view a display through the lenses 212, 214, or they may be positioned on a head-worn vision system 632 (FIG. 6). The lens system 632 is a type of head worn lens system which uses a visor, a helmet, goggles or a cap to place the lenses 212, 214 and optionally also the channel selection mechanisms 112, 114 in front of both eyes 106, 108 of the viewer 104. As shown, a headband 634 positions the lens 212, 214 over the eyes 106, 108. Typically, the variable focus lenses are a material (such as a liquid crystal materials, electro-active polymer gels, field deformable surfaces, or other optically switchable materials) so that the focus of the lenses may be adjusted in a manner known to those in the industry (see U.S. Pat. Nos. 4,190,330 and 6,619,799). In this embodiment, sensors 222 are positioned on the headband 634 so they may detect movement of the eyes. While four sensors 222 are shown in FIG. 6, any number from one or more may be used, and other components and processing algorithms may be applied. In some applications it may be desirable to calibrate the variable focus lens system such that the optical power provided by the lenses is substantially zero at a viewer-preferred focus plane, for example when the vergence of the eyes is consistent with viewing the physical display device. Another example could be to adjust the zero power plane such that both near and distant stereoscopic distances are comfortable for the viewer.

Head-worn vision system 632 may also comprise one or more light emitting diodes (LED), not shown, which may be placed along with sensors 222, to enable monitoring the head position of operator 104 by monitoring the position and orientation of the head-worn vision system 632. In this manner, the operator's direction and location of gaze at any point in time can be sensed for enabling the dynamic lenses 212, 214 when the operator 104 is viewing the stereoscopic 3D display or disable the dynamic lenses 212, 214 when the operator 104 is not viewing the stereoscopic 3D display. The LEDs are preferably infrared in order to emit wavelengths not visible to the operator 109 and thereby not interfere with, e.g., operation of an aircraft and/or the view of the operator 109. The present embodiment, however, is not limited to the use of infrared LEDs or, in fact, is not limited to the use of LEDs, and may include any reflective surface or emissive device attachable to the head-worn vision system 632 that would allow sensing of the position and orientation of the head-worn vision system 632 and, consequently, determination of the direction of gaze or focus of the pilot. The sensor (not shown) for sensing the emissions from the LEDs on the head-worn vision system 632 may be positioned on a stationary nearby object. Other head-cracking configurations may also be used. In one other exemplary embodiment, one or more (but not all) of sensors 222 face forward to collect imagery of the forward scene. The forward scene is then analyzed in conjunction with the binocular gaze angles and focus plane distance detected as described above to determine the spatial location of binocular foveal interest.

In another embodiment, this detected location of interest is used to determine whether the operator is looking at the 3D display or not. This information is then used to enable or disable the variable focus 3D display functionality. One mode of operation when the 3D display content is not being viewed foveally is to switch the variable focus back to a nominal optical power setting. The preferred optical power setting in this case is zero optical power, but other nominal power settings can be used. In yet another embodiment, the optical power of the variable focus eyewear continues to be adjusted based on vergence, but the optical power is actively increased as the convergence distance is decreased over a certain range when not viewing the 3D display or when no 3D display is present. This is analogous to providing reading glasses which automatically adjust their optical power based on convergence of the eyes. It is important to note that changes, if any, in response to convergence distance in this non-3D mode are generally in the opposite direction of those provided when viewing the 3D display, in other words optical power is increased rather than decreased as the convergence distance is decreased.

Figure 7:
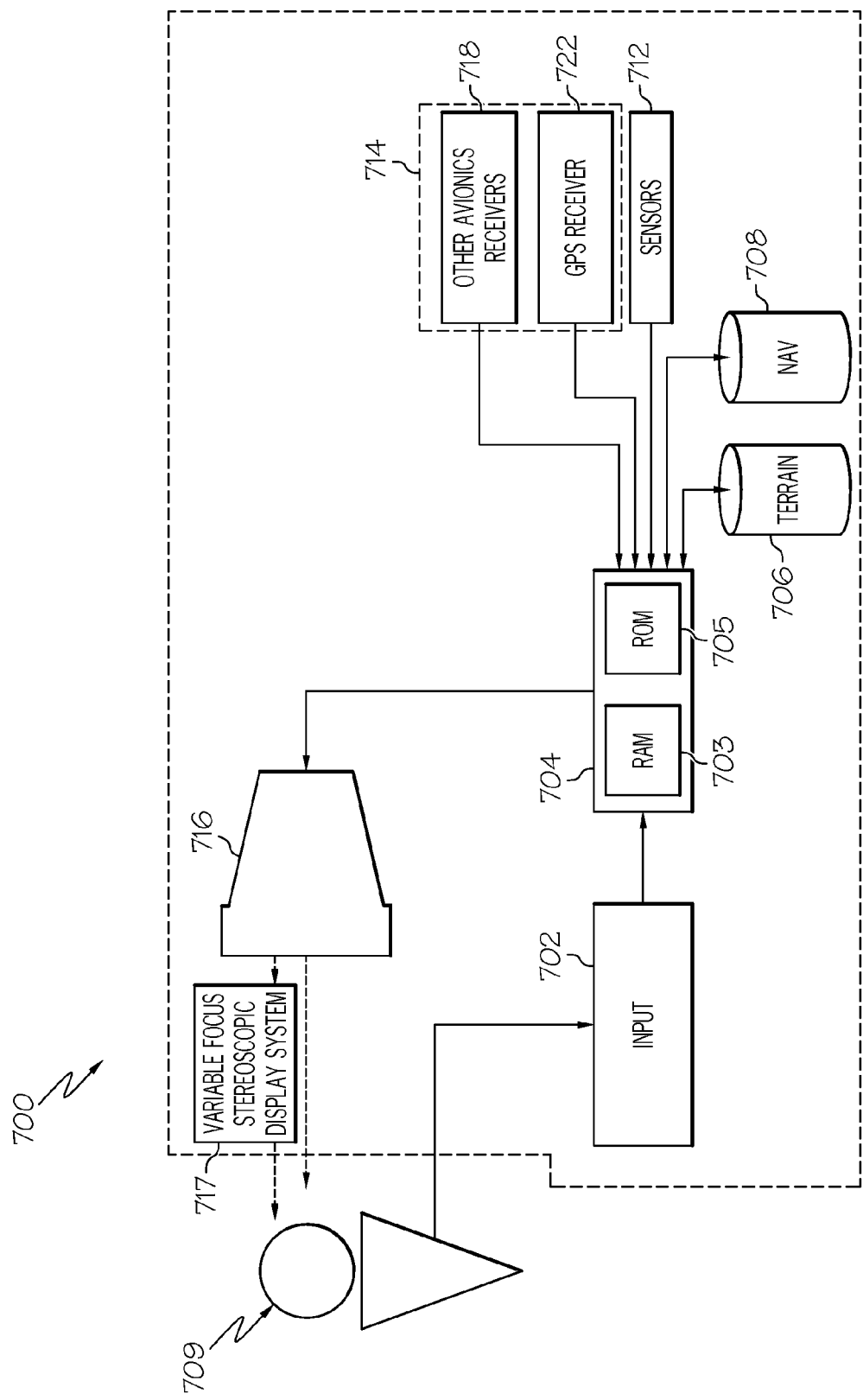
FIG. 7 is a functional block diagram of a aircraft display system in which the exemplary embodiments may be used.

As previously mentioned, many applications exist for the use of the variable focus stereoscopic display system and method described herein. Such a display system would be especially of benefit in an avionics environment such as a flight deck display system 700 (FIG. 7) including a user interface 702, a processor 704, one or more terrain databases 706 (including runway and taxiway information), one or more navigation databases 708, sensors 712, external data sources 714, one or more display devices 716 including the stereoscopic display (FIG. 2), and the variable focus lens system 717 previously discussed. The user interface 702 is in operable communication with the processor 704 and is configured to receive input from a user 709 (e.g., a pilot) and, in response to the user input, supplies command signals to the processor 704. The user interface 702 may be any one, or combination, of various known user interface devices including, but not limited to, one or more buttons, switches, knobs, and touch panels (not shown).

The processor 704 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 704 includes on-board RAM (random access memory) 703, and on-board ROM (read-only memory) 705. The program instructions that control the processor 704 may be stored in either or both the RAM 703 and the ROM 705. For example, the operating system software may be stored in the ROM 705, whereas various operating mode software routines and various operational parameters may be stored in the RAM 703. The software executing the exemplary embodiment is stored in either the ROM 705 or the RAM 703. It will be appreciated that this is merely exemplary of one scheme for storing operating system software and software routines, and that various other storage schemes may be implemented.

The memory 703, 705 may be realized as RAM memory, flash memory, EPROM memory, EEPROM memory, registers, a hard disk, a removable disk, a CD-ROM, or any other form of storage medium known in the art. In this regard, the memory 703, 705 can be coupled to the processor 704 such that the processor 704 can be read information from, and write information to, the memory 703, 705. In the alternative, the memory 703, 705 may be integral to the processor 704. As an example, the processor 704 and the memory 703, 705 may reside in an ASIC. In practice, a functional or logical module/component of the display system 700 might be realized using program code that is maintained in the memory 703, 705. For example, the memory 703, 705 can be used to store data utilized to support the operation of the display system 700, as will become apparent from the following description.

No matter how the processor 704 is specifically implemented, it is in operable communication with the terrain databases 706, the navigation databases 708, and the display devices 716, and is coupled to receive various types of inertial data from the sensors 712, and various other avionics-related data from the external data sources 714. The processor 704 is configured, in response to the inertial data and the avionics-related data, to selectively retrieve terrain data from one or more of the terrain databases 706 and navigation data from one or more of the navigation databases 708, and to supply appropriate display commands to the display devices 716. The display devices 716, in response to the display commands, selectively render various types of textual, graphic, and/or iconic information.

The terrain databases 706 include various types of data representative of the taxiways and runways over which the aircraft is taxing, and the navigation databases 708 include various types of navigation-related data. The sensors 712 may be implemented using various types of inertial sensors, systems, and or subsystems, now known or developed in the future, for supplying various types of inertial data, for example, representative of the state of the aircraft including aircraft speed, heading, altitude, and attitude. In at least one described embodiment, the sensors 712 include an Infrared camera. The other avionics receivers 718 include, for example, an ILS receiver and a GPS receiver. The ILS receiver provides aircraft with horizontal (or localizer) and vertical (or glide slope) guidance just before and during landing and, at certain fixed points, indicates the distance to the reference point of landing on a particular runway. The ILS receiver may also give ground position. The GPS receiver is a multi-channel receiver, with each channel tuned to receive one or more of the GPS broadcast signals transmitted by the constellation of GPS satellites (not illustrated) orbiting the earth.

The display devices 716, as noted above, in response to display commands supplied from the processor 704, selectively render various textual, graphic, and/or iconic information, and thereby supplies visual feedback to the user 709. It will be appreciated that some of the display devices 716 may be implemented using any one of numerous known display devices suitable for rendering textual, graphic, and/or iconic information in a format viewable by the user 709. Non-limiting examples of such display devices include various flat panel displays such as various types of LCD (liquid crystal display), TFT (thin film transistor) displays, and projection display LCD light engines. The display devices 716 may additionally be implemented as a panel mounted display, or any one of numerous known technologies. One or more of the display devices may be a stereoscopic 3D display as described herein.

The display devices 716 may additionally be implemented as a panel mounted display, a HUD (head-up display) projection, or any one of numerous known technologies. It is additionally noted that the display devices 716 may be configured as any one of numerous types of aircraft flight deck displays. For example, it may be configured as a multi-function display, a horizontal situation indicator, a vertical situation indicator, or a primary flight display.

The variable focus stereoscopic display system 717 preferably includes a variable focus lens system 632. The preferred exemplary embodiment also includes the operator 709 of a vehicle, such as a flight crew member of an aircraft, wearing a variable focus lens system 632.

Figure 8:
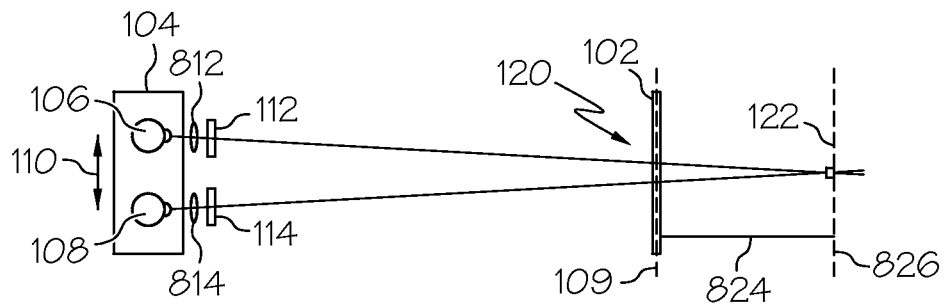
FIG. 8 is a schematic of two eyes viewing a displayed feature on a stereoscopic display having a shifted focus plane in accordance with another exemplary embodiment.
Figure 9:
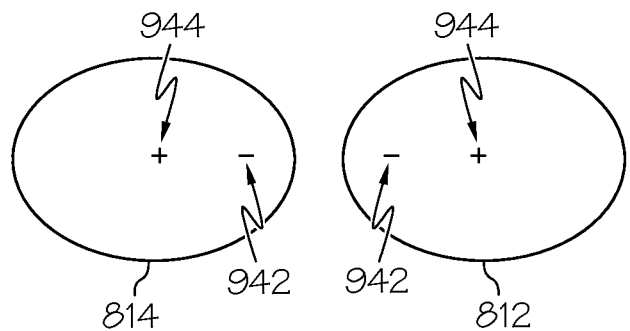
FIG. 9 is a first pair of lenses for implementing the exemplary embodiment of FIG. 8.

Referring to FIG. 8, the first exemplary passive variable focus embodiment includes the lens 812 positioned between the left eye 106 and the stereoscopic display 102, and the lens 814 positioned between the right eye 108 and the stereoscopic display 102. A frontal view of the lenses 812, 814 is shown in FIG. 9. An inner portion 942 of each of the lenses 812, 814 (adjacent to one another) is constructed with a lower (e.g., negative) optical power than a center portion 944 and optionally an outer portion as well. Therefore, as the stereoscopic binocular disparity causes the viewer 104 to look more inward through the portions 942, the lower optical power causes the effective focus plane to adjust closer to the viewer 104 from the physical focus plane 109 of the stereoscopic display 102. Conversely, as the three dimensional view causes the viewer 104 to look less inward and more forward, with reduced convergence, through the portions 944, the higher optical power causes the effective focus plane to adjust further from the viewer 104, for example from the physical focus plane 109 of the stereoscopic display 102 to the vergence-related convergence plane 826 (FIG. 8). The progression between regions of differing optical power can for example vary smoothly or via one or more discrete steps.

The degree of focus compensation to be used may vary with the intended usage or individual preferences. This is true for both passive and active embodiments, as well as combinations of passive and active variable focus techniques wherein the stereoscopic 3D system would include both the dynamic and passive focus lenses. Some viewers may do best with a strong progressive variation, while others may prefer less compensation. This might be based on many factors, including but not limited to the presence of age-related presbyopia, details of the intended application, or level of prior experience with stereoscopic 3D displays (and perhaps a correspondingly higher tolerance of the vergence-accommodation mismatch). The vergence-dependent correction can be combined with appropriate individual optics or prescription and/or stereoscopic selection optics, as desired. In the passive eyewear example, best compensation will be achieved when the head (and not just the eyes) is aimed toward the displayed object or feature of interest, for extended viewing of specific features in the displayed image. Some additional benefit may possibly be obtained by extending the distance from the eyes to the lenses, thereby spreading the progressive power across a larger portion of the lens area. In one exemplary embodiment, the lenses are positioned 50 mm or more from the eyes.

Figure 10:
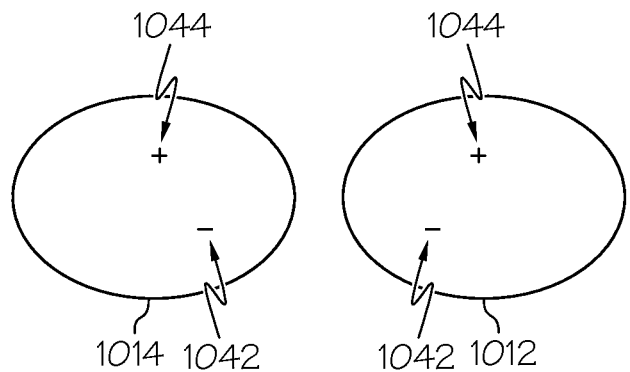
FIG. 10 is a second pair of lenses for implementing the exemplary embodiment of FIG. 8.

A second exemplary passive variable focus embodiment (FIG. 10) includes the lens 1012 positioned between the left eye 106 and the stereoscopic display 102, and the lens 1014 positioned between the right eye 108 and the stereoscopic display 102. A lower inner portion 1042 of each of the lenses 1012, 1014 is constructed with a lower (more negative or less positive) optical power than an upper center and outer portion 1044. Therefore, when the viewer 104 shifts his vision down and inward through the portions 1042, the lower optical power causes the focus plane to adjust closer (not shown) to the viewer 104 from the physical focus plane 109 of the stereoscopic display 102. Conversely, as the viewer 104 shifts his view more outward and up through the portions 1044, the higher optical power causes the focus plane to adjust further from the viewer 104 from the focus plane 109 of the stereoscopic display 102 to the perceived depth or convergence plane 826 (FIG. 8). In a manner similar to the use of traditional bifocal or progressive lens eyewear, the wearer can adjust the orientation to maximize the viewing comfort for the object or feature of interest by moving his head, and therefore the lenses, up or down. Due to the inclusion of the user repositioning, this variant may be best suited for applications which involve familiarity of use and deliberate emphasis on detail in particular portions of the stereoscopic space, such as remote manipulation, monitoring, modeling or analysis. This approach may be less suitable for applications such as entertainment where the region of emphasis is less predictable. The variation of optical power is largely inverted relative to traditional bifocal progression, but is still consistent with viewing near objects through the lower portion and more distant stereoscopic objects through the central or upper portions. Other arrangements can certainly be substituted.

In summary, several exemplary embodiments have been described, including both active and passive devices, of a variable focus stereoscopic display apparatus for varying the focus in response to changing vergence of the viewer. Active devices include adjusting the optical power of lenses while the passive devices have lenses constructed of spatially varying optical power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A variable focus stereoscopic display system modifying a focus distance for viewing a stereoscopic display receiving image data, the variable focus stereoscopic display system comprising:
  a first lens positioned between a first eye and the stereoscopic display;
  a second lens positioned between a second eye and the stereoscopic display; and
  wherein the first and second lenses are configured to modify the optical power for the variable focus stereoscopic display system and therefore the focus distance, the modification of the focus distance consisting of being based solely on a vergence of the first and second eyes, and changes in the focus distance are positively correlated with changes in a convergence distance of lines of sight of the first and second eyes.

2. The variable focus stereoscopic display system of claim 1 wherein the first and second lenses are calibrated to provide about a zero optical power at a viewer preferred focus distance.

3. A variable focus stereoscopic display system for viewing a stereoscopic display which receives image data, comprising:
  a focus plane having an associated focus distance;
  a first lens positioned over a first eye for viewing the stereoscopic display; and
  a second lens positioned over a second eye for viewing the stereoscopic display, the first and second lenses each configured to provide a first optical power or a second optical power to increase the focus distance as a convergence of the first eye and the second eye decreases, and to decrease the focus distance as the convergence increases, the increase or decrease in focus distance being performed independently from the image data.

4. The variable focus stereoscopic display system of claim 3 further comprising:
  a sensor configured to sense an amount of the convergence; and
  a controller configured to modify the optical power of the first and second lenses in response to the amount of the convergence.

5. The variable focus stereoscopic display system of claim 3 wherein each of the first and second lenses comprise:
  a first portion having a first optical power; and
  a second portion having a second optical power greater than the first optical power.

6. The variable focus stereoscopic display system of claim 3 further comprising:
  a sensor configured to sense an amount of the convergence;
  a controller configured to modify the optical power of the first and second lenses in response to the amount of the convergence;
  a third lens positioned between the first eye and the stereoscopic display; and
  a fourth lens positioned between the second eye and the stereoscopic display; wherein each of the third and fourth lenses comprise:
  a first portion having a third optical power; and
  a second portion having a fourth optical power greater than the first optical power.

* * * * *